United States Patent
Fricke et al.

(10) Patent No.: US 7,220,337 B2
(45) Date of Patent: May 22, 2007

(54) UV-CROSS-LINKED LAMINATING ADHESIVE

(75) Inventors: Hans-Joachim Fricke, Dirmstein (DE); Martin Jung, Mannheim (DE); Bernd Meyer-Roscher, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 321 days.

(21) Appl. No.: 10/484,722

(22) PCT Filed: Jul. 17, 2002

(86) PCT No.: PCT/EP02/07933

§ 371 (c)(1),
(2), (4) Date: Jan. 26, 2004

(87) PCT Pub. No.: WO03/011993

PCT Pub. Date: Feb. 13, 2003

(65) Prior Publication Data

US 2004/0168762 A1    Sep. 2, 2004

(30) Foreign Application Priority Data

Jul. 25, 2001    (DE) ............................. 101 35 379

(51) Int. Cl.
*B32B 37/12*    (2006.01)

(52) U.S. Cl. .............................. 156/275.5; 156/275.7; 524/592; 524/593

(58) Field of Classification Search ............. 156/275.5, 156/275.7; 524/592, 593
See application file for complete search history.

(56) References Cited

U.S. PATENT DOCUMENTS

| | | | |
|---|---|---|---|
| 4,609,420 A | 9/1986 | Aydin et al. | |
| 5,623,014 A | 4/1997 | Bauer et al. | |
| 5,763,012 A * | 6/1998 | Zhao et al. | 427/393.5 |
| 2004/0168762 A1 | 9/2004 | Fricke et al. | |

FOREIGN PATENT DOCUMENTS

| | | |
|---|---|---|
| EP | 0 148 386 | 7/1985 |
| EP | 0 350 157 | 1/1990 |
| WO | 93/25588 | 12/1993 |
| WO | 00 63314 | 10/2000 |

OTHER PUBLICATIONS

U.S. Appl. No. 10/537,818, filed Jun. 6, 2005, Jung et al.

* cited by examiner

*Primary Examiner*—David W. Wu
*Assistant Examiner*—Satya B. Sastri
(74) *Attorney, Agent, or Firm*—Oblon, Spivak, McClelland, Maier & Neustadt, P.C.

(57) ABSTRACT

A composition comprising an aqueous polymer dispersion, characterised in that a) the composition contains 0.001 to 0.5 mol of a photo-initiator, which causes a cross-linking reaction on irradiation with energy-rich light and b) the polymer dispersed in the dispersion has 0.0001 to 1 mol of keto or aldehyde groups, whereby the mol amounts relate to 100 g of the dispersed polymer.

13 Claims, No Drawings

UV-CROSS-LINKED LAMINATING ADHESIVE

The invention relates to a composition comprising an aqueous polymer dispersion, wherein
 a) the composition contains from 0.0001 to 0.5 mol of a photoinitiator which on exposure to high-energy light brings about a crosslinking reaction, and
 b) the polymer dispersed in the dispersion has from 0.0001 to 1 mol of keto or aldehyde groups, the molar data being based in each case on 100 g of the dispersed polymer.

The invention further relates to the use of the composition as an adhesive, especially for high gloss film lamination, and to a method of high gloss film lamination.

Crosslinkable adhesives are frequently used in high gloss film lamination. In high gloss film lamination, first a transparent polymer film, generally oriented polypropylene OPP or else polyacetate, is coated with the liquid adhesive. Then the adhesive is dried and the coated film is then laminated, using pressure and heat, to the printed material, generally a printed card or paper. The resultant laminate is frequently grooved or embossed during further processing. For stability during grooving or embossing the adhesive layer must withstand these deformations of the laminate, and in the groove or at the embossed points there must be no separation of the gloss film from the printed material. To ensure this, chemically crosslinked adhesive systems are generally used. Since the crosslinking systems usually employed here require time to build up the necessary cohesion in the adhesive layer, the laminates produced must firstly be stored for some hours before they can be grooved or embossed. This intermediate storage is increasingly perceived as a disadvantage, since it means delaying work on orders.

Chemically crosslinking polymer dispersions for high gloss film lamination are known, for example, from EP-A-148386 or EP-A644902.

DE-A-19916663 discloses UV-crosslinkable polymer dispersions as adhesives for high gloss film lamination. With these adhesives as well the quality of the resulting laminate depends on the duration of intermediate storage of the adhesive-coated films. As the storage period goes on, the quality becomes poorer.

It is an object of the present invention to provide adhesives for high gloss film lamination where the quality of the resulting laminates is independent of the storage time of the coated films.

The laminates obtained are to have high strength, high gloss, and good adhesion, even in the area of grooves or embossments in the card.

We have found that this object is achieved by means of the compositions defined at the outset and their use.

The composition of the invention comprises an aqueous dispersion of a polymer which can be crosslinked by UV radiation.

For this purpose the composition comprises a photoinitiator. On irradiating with high-energy light, in particular UV light, the photoinitiator brings about crosslinking of the polymer, preferably by a chemical grafting reaction of the photoinitiator with a spatially adjacent polymer chain. In particular, the crosslinking may take place by insertion of a carbonyl group of the photoinitiator into an adjacent C—H bond, forming a —C—C—O—H group.

The composition comprises from 0.0001 to 0.5 mol, particularly preferably from 0.0002 to 0.1 mol, very particularly preferably from 0.0003 to 0.01 mol, of the photoinitiator, or molecule group active as the photoinitiator, per 100 g of polymer.

The photoinitiator comprises for example acetophenone, benzophenone, benzoin ethers, benzil dialkyl ketals or derivatives thereof.

The photoinitiator is preferably bonded to the polymer dispersed in the aqueous dispersion (called simply polymer hereinbelow).

The photoinitiator particularly preferably comprises a photoinitiator which has been incorporated into the polymer chain by free-radical copolymerization. For this purpose the photoinitiator preferably comprises an acrylic or methacrylic group.

Suitable copolymerizable photoinitiators are derivatives of acetophenone or benzophenone which contain at least one, preferably one, ethylenically unsaturated group. The ethylenically unsaturated group preferably comprises an acrylic or methacrylic group.

The ethylenically unsaturated group may have direct bonding to the phenyl ring of the derivative of acetophenone or of benzophenone. There is generally a spacer group (spacer) between the phenyl ring and the ethylenically unsaturated group.

The spacer group may, for example, contain up to 100 carbon atoms.

Suitable acetophenone derivatives or benzophenone derivatives are described, for example, in EP-A-346 734, EP-A-377199 (claim 1), DE-A-4 037 079 (claim 1) and DE-A-3 844 444 (claim 1) and are also disclosed in the present application by way of this reference. Preferred acetophenone derivatives and benzophenone derivatives have the formula

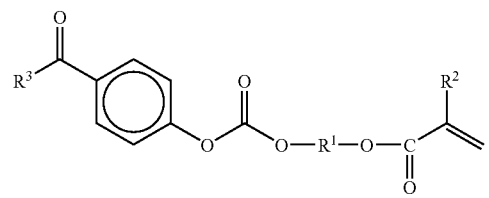

where $R^1$ is an organic radical having up to 30 carbon atoms, $R^2$ is a hydrogen atom or methyl and $R^3$ is unsubstituted or substituted phenyl or $C_1$–$C_4$ alkyl.

$R^1$ is particularly preferably alkylene, in particular $C_2$–$C_8$ alkylene.

$R^3$ is particularly preferably methyl or phenyl.

The polymer further contains from 0.0001 to 1 mol, preferably from 0.0002 to 0.10 mol, with particular preference from 0.0006 to 0.03mol, of keto or aldehyde groups.

The keto or aldehyde groups are preferably attached to the polymer by copolymerization of copolymerizable, ethylenically unsaturated compounds containing keto or aldehyde groups. Suitable compounds of this kind include acrolein, methacrolein, vinyl alkyl ketones having from 1 to 20, preferably from 1 to 10, carbon atoms in the alkyl radical, formyl styrene, alkyl (meth)acrylates having one or two keto or aldehyde groups or one keto group and one aldehyde group in the alkyl radical, the alkyl radical preferably containing a total of from 3 to 10 carbon atoms, e.g., (meth)acryloyloxyalkylpropanals, such as are described in DE-A-2722097. Also suitable, furthermore, are N-oxoalkyl (meth)acrylamides such as are known, for example, from U.S. Pat No. 4,226,007; DE-A-2061213 or DE-A-2207209.

Particular preference is given to acetoacetyl (meth)acrylate, acetoacetoxyethyl (meth)acrylate, and, in particular, diacetoneacrylamide.

The polymer has preferably been built up from free-radically polymerizable compounds (monomers).

Preferably at least 40% by weight of the polymer, particularly preferably at least 60% by weight, very particularly preferably at least 80% by weight, is composed of principal monomers.

The principal monomers are selected from the group consisting of $C_1$–$C_{20}$ alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing from 1 to 10 carbon atoms, aliphatic hydrocarbons having from 2 to 8 carbon atoms and 1 or 2 double bonds, and mixtures of these monomers.

Mention may be made, for example, of alkyl (meth)acrylates having a $C_1$–$C_{10}$ alkyl radical, such as methyl methacrylate, methyl acrylate, n-butyl acrylate, ethyl acrylate, and 2-ethylhexyl acrylate.

Mixtures of the alkyl (meth)acrylates are also particularly suitable.

Examples of vinyl esters of carboxylic acids having from 1 to 20 carbon atoms are vinyl laurate, vinyl stearate, vinyl propionate, Versatic acid vinyl esters, and vinyl acetate.

Possible vinylaromatic compounds are vinyltoluene, α- and p-methylstyrene, α-butylstyrene, 4-n-butylstyrene, 4-n-decylstyrene, and, preferably, styrene. Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Examples of vinyl ethers which may be mentioned are vinyl methyl ether and vinyl isobutyl ether. Preference is given to vinyl ethers of alcohols containing from 1 to 4 carbon atoms.

As hydrocarbons having from 2 to 8 carbon atoms and two olefinic double bonds, mention may be made of butadiene, isoprene and chloroprene.

Preferred principal monomers are the $C_1$–$C_{10}$ alkyl acrylates and $C_1$–$C_{10}$ alkyl methacrylates, in particular $C_1$–$C_8$ alkyl acrylates and $C_1$–$C_8$ alkyl methacrylates, and in each case the acrylates are particularly preferred.

Very particular preference is given to methyl acrylate, ethyl acrylate, n-butyl acrylate, n-hexyl acrylate, octyl acrylate and 2-ethylhexyl acrylate, and also to mixtures of these monomers.

The polymer further contains, preferably, abovementioned monomers containing a photoinitiator group and abovementioned monomers containing a keto or aldehyde group, in amounts such that the desired amount of these groups is present in the polymer.

Besides the principal monomers above, the polymer may contain other monomers, e.g., monomers with carboxylic acid, sulfonic acid or phosphonic acid groups. Carboxylic acid groups are preferred. Examples which may be mentioned are acrylic acid, methacrylic acid, itaconic acid, maleic acid, and fumaric acid.

Examples of other monomers are monomers containing hydroxyl groups, in particular $C_1$–$C_{10}$ hydroxyalkyl (meth)acrylates, and (meth)acrylamide.

Other monomers which may additionally be mentioned are phenyloxyethyl glycol mono(meth)acrylate, glycidyl acrylate, glycidyl methacrylate, and amino (meth)acrylates, such as 2-aminoethyl (meth)acrylate.

Monomers which carry other functional groups in addition to the double bond, e.g., isocyanate groups, amino groups, hydroxyl groups, amide groups or glycidyl groups, may, for example, improve the adhesion to substrates.

The glass transition temperature of the polymer is preferably below 60° C., in particular from −50 to +60° C., particularly preferably from −30 to +40° C., and very particularly preferably from −30 to +20° C.

The glass transition temperature of the polymer may be determined by conventional methods, such as differential thermal analysis or differential scanning calorimetry (see, for example, ASTM 3418/82, midpoint temperature).

The polymer is preferably prepared by emulsion polymerization and is therefore an emulsion polymer.

However, it may also be prepared, for example, by solution polymerization, followed by dispersion in water.

Surface-active compounds used in the emulsion polymerisation are ionic and/or nonionic emulsifiers and/or protective colloids or, respectively, stabilizers.

A detailed description of suitable protective colloids is found in Houben-Weyl, Methoden der organischen Chemie, Vol. XIV/1, Makromolekulare Stoffe, Georg-Thieme-Verlag, Stuttgart, 1961, pp. 411–420. Emulsifiers which may be used are either anionic, cationic or else nonionic emulsifiers. Preferably, the auxiliary surface-active substances used are exclusively emulsifiers, whose molar mass is usually below 2000 g/mol, unlike that of the protective colloids. If mixtures of surface-active substances are used, the individual components must, of course, be compatible with one another, and in case of doubt this can be checked using a few preliminary experiments. Preference is given to the use of anionic and nonionic emulsifiers as surface-active substances. Examples of commonly used auxiliary emulsifiers are ethoxylated fatty alcohols (EO units: from 3 to 50, alkyl: $C_8$–$C_{36}$), ethoxylated mono-, di- and trialkylphenols (EO units: from 3 to 50, alkyl: $C_4$–$C_9$), alkali metal salts of dialkyl esters of sulfosuccinic acid, and also the alkali metal and ammonium salts of alkyl sulfates (alkyl: $C_8$–$C_{12}$), of ethoxylated alkanols (EO units: from 4 to 30, alkyl: $C_{12}$–$C_{18}$), of ethoxylated alkylphenols (EO units: from 3 to 50, alkyl: $C_4$–$C_9$), of alkylsulfonic acids (alkyl: $C_{12}$–$C_{18}$), and of alkylarylsulfonic acids (alkyl: $C_9$–$C_{18}$).

Other suitable emulsifiers are compounds of the formula II

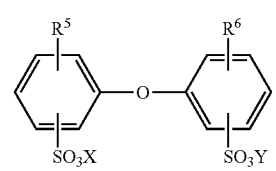

(II)

where $R^5$ and $R^6$ are hydrogen or $C_4$–$C_{14}$ alkyl but are not simultaneously hydrogen, and C and Y may be alkali metal ions and/or ammonium ions. $R^5$ and $R^6$ are preferably linear or branched alkyl having from 6 to 18 carbon atoms or hydrogen and in particular having 6, 12 or 16 carbon atoms, $R^5$ and $R^6$ not both being simultaneously hydrogen. X and Y are preferably sodium, potassium or ammonium ions, sodium being particularly preferred. Particularly advantageous compounds II are those in which X and Y are sodium, $R^5$ is branched alkyl having 12 carbon atoms and $R^6$ is hydrogen or $R^5$. Use is frequently made of industrial mixtures which have a proportion of from 50 to 90% by weight of the monoalkylated product, for example Dowfax® 2A1 (trademark of Dow Chemical Company).

Suitable emulsifiers may also be found in Houben-Weyl, Methoden der organischen Chemie, Vol. 14/1, Makromolekulare Stoffe, Georg Thieme verlag, Stuttgart, 1961, pages 192–208.

Examples of tradenames of the above-mentioned emulsifiers are Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, and Emulphor NPS 25.

The surface-active substance is usually used in amounts of from 0.1 to 10% by weight, based on the monomers to be polymerized.

Examples of water-soluble initiators for the emulsion polymerization are ammonium and alkali metal salts of peroxodisulfuric acid, e.g., sodium peroxodisulfate, and hydrogen peroxide and organic peroxides, such as tert-butyl hydroperoxide. Reduction-oxidation (redox) initiator systems are particularly suitable.

Redox initiator systems are composed of at least one, usually inorganic reducing agent and an inorganic or organic oxidant.

The oxidation component is, for example, one of the initiators mentioned above for the emulsion polymerization.

The reducing components are, for example, alkali metal salts of sulfurous acid, such as sodium sulfite and sodium hydrogensulfite, alkali metal salts of disulfurous acid, such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems may be used accompanied by soluble metal compounds whose metallic component can occur in more than one valence state.

Examples of usual redox initiator systems are ascorbic acid/iron(II) sulfate/sodium peroxodisulfate, tert-butyl hydroperoxide/sodium disulfite and tert-butyl hydroperoxide/Na hydroxymethanesulfinate. The individual components, e.g., the reducing component, may also be mixtures, e.g., a mixture of the sodium salt of hydroxymethanesulfinic acid and sodium disulfite.

The compounds mentioned are usually used in the form of aqueous solutions, the lower concentration being determined by the amount of water acceptable in the dispersion and the upper concentration by the solubility in water of the particular compound. The concentration is generally from 0.1 to 30% by weight, preferably from 0.5 to 20% by weight, particularly preferably from 1.0 to 10% by weight, based on the solution.

The amount of the initiators is generally from 0.1 to 10% by weight, preferably from 0.5 to 5% by weight, based on the monomers to be polymerized. It is also possible to use more than one different initiator in the emulsion polymerization.

Regulators may be used in the polymerization, for example in amounts of from 0 to 0.8 part by weight, based on 100 parts by weight of the monomers to be polymerized, and these reduce the molecular weight. Examples of suitable compounds are those with a thiol group, such as tert-butyl mercaptan, ethylhexyl thioglycolate, mercaptoethanol, mercaptopropyltrimethoxysilane and tert-dodecyl mercaptan. The proportion of these regulators, where the composition is for use as an adhesive for composite film lamination, is in particular from 0.05 to 0.8 part by weight, preferably from 0.1 to 0.5 part by weight, based on 100 parts by weight of the monomers to be polymerized. For use as an adhesive for high gloss film lamination, the inclusion of a regulator is less preferred. The regulators do not contain any polymerizable, ethylenically unsaturated groups. The regulators bring about a termination of the polymerization chain and are therefore bonded terminally onto the polymer chains.

The emulsion polymerization generally takes place at from 30 to 130° C., preferably from 50 to 90° C. The polymerization medium may be composed either exclusively of water or of mixtures of water and liquids, such as methanol, which are miscible therewith. It is preferable to use exclusively water. The emulsion polymerization may be carried out either as a batch process or as a feed process, and this includes stepped or gradient procedures. reference is given to the feed process in which a portion of the polymerization mixture forms an initial charge, is heated to the polymerization temperature and begins to polymerize, and the remainder of the polymerization mixture is then fed into the polymerization zone, usually via more than one spatially separate feed streams, of which one or more comprise(s) the monomers in pure or in emulsified form, these feed streams being supplied either continuously, or in stages, or under a concentration gradient, during which the polymerization is maintained. A seed polymer may be included in the initial polymerization charge in order, for example, to achieve better regulation of particle size.

The manner in which the initiator is added to the polymerization vessel in the course of the free-radical aqueous emulsion polymerization is known to the person of average skill in the art. It can either be included entirely in the initial charge to the polymerization vessel or else added, continuously or in stages, at the rate at which it is consumed in the course of the free-radical aqueous emulsion polymerization. In detail, this will depend both on the chemical nature of the initiator system and on the polymerization temperature. It is preferable to include a portion in the initial charge and to supply the remainder to the polymerization zone at the rate at which it is consumed.

In order to remove residual monomers, it is usual to add initiator after completion of the actual emulsion polymerization, i.e., after a monomer conversion of at least 95%.

In the feed process, the individual components can be added to the reactor from above, through the side or from below, through the base of the reactor.

The emulsion polymerization gives aqueous dispersions of the polymer, generally with solids contents of from 15 to 75% by weight, preferably from 40 to 75% by weight.

For a high space-time yield from the reactor, preference is given to dispersions with a very high solids content. In order to be able to achieve solids contents >60% by weight, a bimodal or polymodal particle size should be established, since otherwise the viscosity becomes too high and the dispersion can no longer be handled. A new particle generation can be produced, for example, by adding seed (EP 81083), by adding excess amounts of emulsifier, or by adding miniemulsions. Another advantage associated with the low viscosity at high solids contents is improved coating behavior at high solids contents. One or more new generations of particles can be produced at any desired time, depending on the particle size distribution required for low viscosity.

The polymer is used in the form of its aqueous dispersion.

The composition preferably further comprises a compound containing at least 2 functional groups, in particular from 2 to 5 functional groups, with particular preference 2 or 3 functional groups, with very particular preference 2 functional groups, which undergo a crosslinking reaction with keto or aldehyde groups.

Examples of suitable functional groups include hydrazide, hydroxylamine or oxime ether or amino groups.

Suitable compounds containing hydrazide groups are, for example, polycarboxylic hydrazides having a molar weight of up to 500 g/mol.

Particularly preferred hydrazide compounds are dicarboxylic dihydrazides containing preferably from 2 to 10 carbon atoms.

Examples that may be mentioned include oxalic dihydrazide, malonic dihydrazide, succinic dihydrazide, glutaric acid dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide.

Suitable compounds containing hydroxylamine groups or oxime ether groups are specified, for example, in WO 93/25588.

The compounds preferably comprise hydroxylamine derivatives of the formula

$(H_2N-O)_2A$   I, where A is a saturated or unsaturated aliphatic, linear or branched hydrocarbon radical of 2 to 12 carbon atoms, which may be interrupted by from 1 to 3 nonadjacent oxygen atoms, and n is 2, 3 or 4, or an oxime ether of the formula

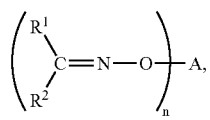

$$\left( \begin{matrix} R^1 \\ \phantom{R}\diagdown \\ \phantom{R}C=N-O \\ \phantom{R}\diagup \\ R^2 \end{matrix} \right)_n A,$$   II where A and n are as defined above and $R^1$ and $R^2$ independently of one another are $C_1$–$C_{10}$ alkyl, $C_1$–$C_{10}$ alkoxy, $C_5$–$C_{10}$ cycloalkyl or $C_5$–$C_{10}$ aryl, which may also contain from 1 to 3 nonadjacent nitrogen, oxygen or sulfur atoms in the carbon chain or in the carbon ring and may be substituted by from 1 to 3 $C_1$–$C_4$ alkyl or alkoxy groups; $R^1$ or $R^2$ may be a hydrogen atom, or $R^1$ and $R^2$ together form a bridge of from 2 to 14 carbon atoms, it also being possible for some of the carbon atoms to be part of an aromatic ring system.

The variables A in formulae I and II preferably comprise a hydrocarbon chain of from 2 to 8 carbon atoms and n is preferably 2.

The radicals $R^1$ and $R^2$ are each preferably a hydrogen atom, a $C_1$–$C_6$ alkyl group or a $C_1$–$C_6$ alkoxy group. In the case of the hydrogen atoms, only one of the radicals, $R^1$ or $R^2$, may be a hydrogen atom.

Examples of suitable compounds containing amino groups include ethylenediamine, propylenediamine, tetramethylenediamine, pentamethylenediamine, hexamethylenediamine, diethylenetriamine, triethylenetetramine, polyethyleneimines, partially hydrolyzed polyvinylformamides, ethylene oxide and propylene oxide adducts such as the Texaco Jeffamines, cyclohexanediamine, and xylylenediamine.

The compound containing these functional groups may be added to the composition, or to the dispersion of the polymer, at any point in time. In the aqueous dispersion, there is still no crosslinking with the keto or aldehyde groups. Only on drying does crosslinking take place on the coated substrate.

The amount of the compound containing the functional groups is preferably such that the molar ratio of the functional groups to the keto and/or aldehyde groups of the polymer is from 1:10 to 10:1, in particular from 1:5 to 5:1, with particular preference from 1:2 to 2:1, and with very particular preference from 1:1.3 to 1.3:1.

In particular, equimolar amounts of the functional groups and the keto and/or aldehyde groups are preferred.

The composition is used preferably as an adhesive, especially as an adhesive for bonding substrates of large surface area, i.e., for producing laminates (laminating adhesive).

For this purpose, the composition may consist exclusively of the aqueous dispersion of the polymer, preferably with the addition of the functional-group compound dispersed or dissolved in the dispersion, and, where appropriate, photoinitiator (where it is not bonded to the polymer). It may may comprise other additives, e.g., wetting agents, thickeners, protective colloids, light stabilizers, biocides, tackifiers or plasticizers.

Examples of suitable substrates for adhesive bonding are polymer films, in particular made from polyethylene or oriented polypropylene, polyamide, polyethylene terephthalate, cellulose acetate, cellophane, metalized (e.g., aluminum-coated (vapor-coated)) polymer film (abbreviated to metalized films) or else paper, card or metal foils, in particular made from aluminum. The films and foils mentioned may also have been printed, e.g., with printing inks.

The laminating adhesive is applied to at least one large-surface-area substrate, preferably at a layer thickness of from 0.1 to 20 g/m$^2$, particularly preferably from 2 to 15 g/m$^2$, e.g., by knife coating, brushing, etc.

At least one of the two substrates to be adhesive-bonded should be transparent to high-energy light, in particular UV light.

Preferably after drying or air-drying to remove the water in the dispersion (e.g., after from 1 to 60 seconds), the coated substrate may then be laminated to a second substrate at a temperature of for example from 20 to 200° C., preferably from 20 to 70° C., and at a pressure of, for example, from 1 to 30 N/m$^2$, preferably from 3 to 20 N/m$^2$.

The substrate coated with the adhesive preferably comprises a transparent polymer film.

The polymer or, respectively, the dispersion is preferably used as an adhesive for high gloss film lamination.

In high gloss film lamination, paper or card is adhesively bonded to transparent polymer films. The papers or cards may have been printed.

Directly after the adhesive bonding the laminating-adhesive layer may be irradiated, through the transparent film, with high-energy light, which initiates the crosslinking reactions of the photoinitiator group.

The light preferably used is UV light. The UV irradiation may be carried out using commercially available medium-pressure mercury lamps or lasers which emit in the UV region.

The energy radiated may, for example, be from 200 mJ/cm$^2$ to 2000 mJ/cm$^2$, preferably from 500 mJ/cm$^2$ to 1000 mJ/cm$^2$ of irradiated area.

Immediately after the irradiation, further processing may take place, e.g., grooving or embossing of the laminated substrates, e.g., of the cards laminated with film. A waiting period is no longer required.

The novel laminating adhesive gives bonded substrates with high bond strength, even in the region of grooves or embossments, and with high transparency and high gloss. Their quality is affected little if at all by the storage time of the coated films.

EXAMPLES

A) Preparation

The preparation follows the general specification below:

The initial charge (180 g of water and 3.5 g of a styrene seed, 33% strength) was heated to an internal temperature of 90° C., and 10% of feed 2 was introduced initially. After 10 min, feed 1, which comprises the monomers, and feed 2 were started.

Feed 2 was composed of 67 g of sodium peroxodisulfate (2.5% 40 strength). The composition of feed 1 in all cases is 78% butyl acrylate, 20% methyl methacrylate and 2% acrylic acid. In the case of chemical crosslinking diacetone acylamide (DAAM) adipic dihydrazide (ADDH) DAAM is likewise present in the feed (see table). In the case of photocrosslinking a polymerizable photoinitiator can be present optionally in the feed.

Feeds 1 and 2 were metered in over 2 h and polymerization continued for 0.5 h.

The amount of initiator (sodium peroxodisulfate) was in each case 0.3 part by weight, and the emulsifier used comprised 0.5 part by weight of Dowfax® 2 A1 (alkyldiphenyloxide disulfonate) and 0.5 part by weight of Disponil FES77 (sodium lauryl ether sulfate), based on the parts by weight of monomers stated in the table. The solids content was 55%.

In the case of benzophenone, the photoinitiator was stirred into the hot dispersion at 60° C. For chemical crosslinking, that is to say DAAM-containing dispersions, after cooling, an aqueous solution of ADDH was added. The mass ratio of ADDH to DAAM is, in all cases, 2:1.

B) High gloss film lamination

High gloss film lamination with card (Cromolux 70°) and polypropylene (corona-pretreated).

The pretreated side of the polypropylene film (PP) was coated with adhesive. After drying with cold air, the card was applied and rolled on using a laboratory laminating roller. The laminated pieces cut to size were pressed in a roller press.

This was followed by direct irradiation with UV light (1000 MJ/cm$^2$). The laminated specimens, after the time indicated in the table (immediate, 30 minutes, 1 hour or 24 hours, see table), were grooved and/or embossed (grooving, fold in spine of book; embossing) and assessed after 6 weeks:

Grading: 1 Groove, embossing is very satisfactory

2 Groove, embossing has opened slightly at individual points, detached

3 Groove, embossing has opened significantly at individual points

4 Groove, embossing is completely open

TABLE

|  | Chemical crosslinking | | | | Photocrosslinking | | | | Dual crosslinking | | | | | | |
| --- | --- | --- | --- | --- | --- | --- | --- | --- | --- | --- | --- | --- | --- | --- | --- |
| No. | 1 | 2 | 3 | 4 | 5 | 6 | 7 | 8 | 9 | 10 | 11 | 12 | 13 | 14 | 15 |
| DAAM [pphm] | 0.1 | 0.25 | 0.5 | 2.0 | 0 | 0 | 0 | 0 | 0.1 | 0.1 | 0.25 | 0.25 | 0.5 | 0.5 | 0.5 |
| Benzophenone [pphm] | 0 | 0 | 0 | 0 | 0.1 | 0.3 | 0.6 | 1.0 | 0.1 | 0.3 | 0.1 | 0.3 | 0.3 | 0.6 | 1.0 |
| Immediate | 4/4 | 4/4 | 3/4 | 3/4 | 3/3 | 3/3 | 3/3 | 3/3 | 4/4 | 3/3 | 3/3 | 2/3 | 2/3 | 1-2/1- | 1-/3 |
| 30 min | 4/3 | 4/4 | 3/3 | 2/3 | 3/4 | 2/3 | 2/3 | 3-4/3 | 4/4 | 3-4/3 | 3/3 | 2/3 | 2-3/2 | 1-2/1- | 1/2 |
| 1 h | 4/4 | 3/4 | 3/3 | 1-2/3 | 3/4 | 3/3 | 3/3 | 3/3 | 4/3 | 2/3 | 2/3 | 1/3 | 1-2/2-3 | 1-/1- | 1-/2 |
| 24 h | 4/4 | 3/4 | 2-3/3 | 1/1 | 3/4 | 3/2 | 3/3 | 2-3/3 | 3/3 | 2/3 | 2/3 | 1/2 | 1-2/2-3 | 1/2 | 1-/1-2 |

The value before the oblique indicates the result of utilization, the value after the oblique the result of embossing.
It is clearly evident that the combination of the crosslinker systems is advantageous as compared with the use of an individual crosslinker system, e.g.
Variant 11 (with a total of just 0.35 ppm crosslinker) attains the properties of version 3 (0.5 pphm crosslinker).
Variant 12 (with a total of 0.55 pphm crosslinker) exceeds the properties of 3 (0.5 pphm crosslinker) and of 7 (0.6 pphm crosslinker).
Variant 14 (with a total of 1.1 pphm crosslinker) exceeds the properties of 4 (pphm crosslinker).

We claim:

1. A method of large-surface-area adhesive bonding of a UV-transparent film substrate to second substrate, which comprises:

applying a laminating adhesive comprising:
an aqueous polymer dispersion, wherein
a) the laminating adhesive comprises from 0.0001 to 0.5 mol of a photoinitiator which on exposure to high-energy light causes a crosslinking reaction; and
b) the polymer dispersed in the dispersion has from 0.0001 to 1 mol of keto or aldehyde groups, the molar data being based in each case on 100 g of the dispersed polymer to at least one of the substrates to form an adhesive film;
drying the adhesive film;
adhesively bonding the substrates; and then
exposing the UV-transparent film to high-energy light,
wherein the second substrate comprises paper or card.

2. The method as claimed in claim 1, wherein the laminating adhesive is applied to at least one of the substrates at a thickness of from 0.1 to 20 g/m$^2$.

3. The method as claimed in claim 1, wherein the high energy light is UV light.

4. The method as claimed in claim 1, wherein energy radiated by the high-energy light ranges from 200 mJ/cm$^2$ to 2000 mJ/cm$^2$ of irradiated area.

5. The method as claimed in claim 1, wherein after drying the substrate having the laminating adhesive thereon, the substrate is bonded to the second substrate at a temperature ranging from 20 to 200° C.

6. The method as claimed in claim 1, wherein after drying the substrate having the laminating adhesive thereon, the substrate is bonded to the second substrate at a pressure ranging from 1 to 30 N/m$^2$.

7. The method as claimed in claim 1, wherein the photoinitiator is bonded to the polymer.

8. The method as claimed in claim 1, wherein the photoinitiator comprises a benzophenone, acetophenone, a derivative of benzophenone or a derivative of acetophenone.

9. The method as claimed in claim 1, wherein the laminating adhesive further comprises a compound containing at least two functional groups which undergo crosslinking with keto or aldehyde groups.

10. The method as claimed in claim 9, wherein the amount of the compound is from 0.0001 to 1 mol based on 100 g of the dispersed polymer.

11. The method as claimed in claim 9, wherein the functional groups of the compound comprise hydrazide, hydroxylamine, oxime ether or amino groups.

12. The method as claimed in claim 1, wherein the polymer is composed of at least 40% by weight of principal monomers selected from C1–C20 alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing from 1 to 10 carbon atoms, aliphatic hydrocarbons having from 2 to 8 carbon atoms and one or two double bonds, and mixtures of these monomers.

13. The method as claimed in claim 1, wherein the polymer has a glass transition temperature of from −50° C. to 40° C.

* * * * *